(12) United States Patent
Vokaliga et al.

(10) Patent No.: US 11,372,556 B2
(45) Date of Patent: Jun. 28, 2022

(54) SNAPSHOT ACCESS USING NOCOPY UNDEFINED THIN DEVICES

(71) Applicant: EMC IP HOLDING COMPANY LLC, Hopkinton, MA (US)

(72) Inventors: Deepak Vokaliga, Hopkinton, MA (US); Sandeep Chandrashekhara, Shrewsbury, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 17/010,960

(22) Filed: Sep. 3, 2020

(65) Prior Publication Data

US 2022/0066653 A1    Mar. 3, 2022

(51) Int. Cl.
| | | |
|---|---|---|
| G06F 12/00 | (2006.01) | |
| G06F 13/00 | (2006.01) | |
| G06F 3/06 | (2006.01) | |
| G06F 11/14 | (2006.01) | |

(52) U.S. Cl.
CPC ............ *G06F 3/0619* (2013.01); *G06F 3/067* (2013.01); *G06F 3/0631* (2013.01); *G06F 3/0659* (2013.01); *G06F 11/1464* (2013.01); *G06F 11/1469* (2013.01); *G06F 2201/84* (2013.01)

(58) Field of Classification Search
CPC .... G06F 3/0619; G06F 3/0631; G06F 3/0659; G06F 3/0607; G06F 11/1464; G06F 11/1469; G06F 2201/84
USPC ........................................................ 711/162
See application file for complete search history.

(56) References Cited

U.S. PATENT DOCUMENTS

| | | | | |
|---|---|---|---|---|
| 7,865,596 B2* | 1/2011 | Grosner | .............. | H04L 67/1095 709/226 |
| 7,873,619 B1* | 1/2011 | Faibish | .................... | G06F 16/13 707/705 |
| 7,958,199 B2* | 6/2011 | Ferrari | ................ | H04L 67/1017 709/211 |
| 8,239,584 B1* | 8/2012 | Rabe | ...................... | G06F 3/0605 710/8 |
| 8,332,381 B1* | 12/2012 | Coudron | ................. | G06F 3/048 707/706 |
| 8,850,145 B1* | 9/2014 | Haase | ...................... | G06F 11/14 711/162 |
| 8,898,402 B1* | 11/2014 | Strange | ................. | G06F 3/0665 711/154 |
| 8,972,340 B1* | 3/2015 | Haase | ................... | G06F 16/113 707/609 |

(Continued)

*Primary Examiner* — Sheng Jen Tsai
(74) *Attorney, Agent, or Firm* — Anderson Gorecki LLP (57) ABSTRACT

A thin device (TDev) is tagged to identify the TDev as being used to access snapshot data on the storage system. If a snapshot is to be shipped to a cloud repository, the tagged TDev is linked to the snapshot, and mounted to a cloud tethering subsystem. When the tagged TDev is linked to the cloud tethering subsystem, the snapshot subsystem reads the thin device tag and, if the thin device is tagged, selectively does not execute a define process on the tagged thin device. By not executing the define process, the tracks of the thin device do not contain metadata identifying the location of the snapshot data on the storage system. Writes to source do not require a private copy of the old data for the snapshot, even if the snapshot is created in a different storage resource pool than the source data volume.

16 Claims, 6 Drawing Sheets

(56) References Cited

U.S. PATENT DOCUMENTS

| | | | | |
|---|---|---|---|---|
| 9,009,437 B1* | 4/2015 | Bjornsson | G06F 3/0689 | 711/170 |
| 9,047,169 B1* | 6/2015 | Haase | G06F 3/0604 | |
| 9,063,892 B1* | 6/2015 | Taylor | G06F 11/1469 | |
| 9,075,755 B1* | 7/2015 | Haase | G06F 11/2043 | |
| 9,218,138 B1* | 12/2015 | Haase | G06F 3/0604 | |
| 9,246,996 B1* | 1/2016 | Brooker | H04L 67/1008 | |
| 9,384,206 B1* | 7/2016 | Bono | G06F 3/0683 | |
| 9,460,102 B1* | 10/2016 | Bono | G06F 3/0641 | |
| 9,503,517 B1* | 11/2016 | Brooker | H04L 67/1097 | |
| 9,557,925 B1* | 1/2017 | Natanzon | G06F 3/0689 | |
| 9,569,569 B1* | 2/2017 | Colon | G06F 11/1076 | |
| 9,804,993 B1* | 10/2017 | Brooker | G06F 11/008 | |
| 9,823,840 B1* | 11/2017 | Brooker | G06F 3/0604 | |
| 9,846,544 B1* | 12/2017 | Bassov | G06F 3/0665 | |
| 9,893,953 B1* | 2/2018 | Castelli | H04L 41/145 | |
| 9,946,569 B1* | 4/2018 | Beedu | G06F 9/45558 | |
| 9,965,216 B1* | 5/2018 | Jaganathan | G06F 11/1458 | |
| 10,048,885 B1* | 8/2018 | Bono | G06F 3/067 | |
| 10,140,039 B1* | 11/2018 | Baruch | G06F 11/1471 | |
| 10,154,112 B1* | 12/2018 | Anthony | G06F 3/0604 | |
| 10,162,597 B1* | 12/2018 | Bigman | G06F 7/00 | |
| 10,216,757 B1* | 2/2019 | Armangau | G06F 16/125 | |
| 10,242,011 B1* | 3/2019 | Basov | G06F 16/128 | |
| 10,242,012 B1* | 3/2019 | Basov | G06F 16/18 | |
| 10,250,679 B1* | 4/2019 | Natanzon | G06F 3/067 | |
| 10,254,970 B1* | 4/2019 | Martin | G06F 3/0647 | |
| 10,261,717 B1* | 4/2019 | Martin | G06F 3/0685 | |
| 10,261,944 B1* | 4/2019 | Armangau | G06F 16/128 | |
| 10,387,369 B1* | 8/2019 | Davenport | G06F 3/0689 | |
| 10,462,012 B1* | 10/2019 | Rao | H04L 41/12 | |
| 10,481,794 B1* | 11/2019 | Castelli | G06F 3/0644 | |
| 10,482,065 B1* | 11/2019 | Armangau | G06F 16/128 | |
| 10,496,601 B1* | 12/2019 | Natanzon | G06F 3/0685 | |
| 10,776,317 B1* | 9/2020 | Veeraswamy | G06F 3/0604 | |
| 10,809,932 B1* | 10/2020 | Armangau | G06F 3/0608 | |
| 10,831,207 B1* | 11/2020 | Leung | G07C 5/085 | |
| 10,911,540 B1* | 2/2021 | Gunasekaran | G06F 3/0632 | |
| 10,929,423 B1* | 2/2021 | Patwardhan | G06F 11/1435 | |
| 2010/0042776 A1* | 2/2010 | Seo | G06F 12/123 | 711/103 |
| 2010/0322255 A1* | 12/2010 | Hao | H04L 45/00 | 370/398 |
| 2012/0124285 A1* | 5/2012 | Soran | G06F 3/0665 | 711/114 |
| 2013/0036128 A1* | 2/2013 | Ben-Tsion | G06F 16/214 | 707/756 |
| 2013/0080728 A1* | 3/2013 | Cashman | G06F 3/0665 | 711/170 |
| 2013/0275447 A1* | 10/2013 | Ben-Tsion | G06F 16/214 | 707/756 |
| 2014/0156877 A1* | 6/2014 | Tylik | G06F 3/0653 | 710/18 |
| 2014/0236898 A1* | 8/2014 | Hankins | G06F 3/0689 | 707/639 |
| 2015/0242294 A1* | 8/2015 | Lapierre | G06F 11/079 | 714/37 |
| 2015/0248418 A1* | 9/2015 | Bhardwaj | G06F 16/122 | 707/694 |
| 2015/0324713 A1* | 11/2015 | Haas | G06Q 10/067 | 705/7.27 |
| 2015/0358421 A1* | 12/2015 | Gupta | H04L 67/288 | 709/202 |
| 2016/0117226 A1* | 4/2016 | Hetrick | G06F 11/1451 | 711/162 |
| 2016/0134599 A1* | 5/2016 | Ross | H04L 63/08 | 713/168 |
| 2016/0349992 A1* | 12/2016 | Basak | G06F 3/0653 | |
| 2017/0161286 A1* | 6/2017 | Eda | G06F 3/0685 | |
| 2017/0324813 A1* | 11/2017 | Jain | G06F 9/5016 | |
| 2017/0329552 A1* | 11/2017 | Baldwin | G06F 3/0649 | |
| 2017/0351615 A1* | 12/2017 | Agombar | G06F 12/0831 | |
| 2018/0004676 A1* | 1/2018 | Imazaki | G06F 3/0688 | |
| 2018/0081548 A1* | 3/2018 | Barzik | G06F 3/067 | |
| 2018/0124157 A1* | 5/2018 | Gao | G06F 3/0607 | |
| 2018/0129443 A1* | 5/2018 | Karve | G06F 3/0611 | |
| 2018/0129520 A1* | 5/2018 | Zhang | G06F 9/45558 | |
| 2018/0152278 A1* | 5/2018 | Chen | H04L 67/141 | |
| 2018/0288137 A1* | 10/2018 | Veeramani | G06F 9/5044 | |
| 2019/0026466 A1* | 1/2019 | Krasser | G06N 7/005 | |
| 2019/0155512 A1* | 5/2019 | Tenner | H04L 67/1097 | |
| 2019/0271157 A1* | 9/2019 | Baggs | B32B 7/14 | |
| 2019/0317682 A1* | 10/2019 | Li | G06F 3/0632 | |
| 2019/0334884 A1* | 10/2019 | Ross | G06F 21/41 | |
| 2019/0340292 A1* | 11/2019 | Chandrashekhara | G06F 12/0875 | |
| 2020/0121258 A1* | 4/2020 | Zhu | A61B 5/0295 | |
| 2021/0036714 A1* | 2/2021 | Martin | H03M 7/60 | |
| 2021/0081432 A1* | 3/2021 | Grunwald | G06F 16/2379 | |
| 2021/0133098 A1* | 5/2021 | Wilson | G06F 12/0253 | |
| 2021/0133114 A1* | 5/2021 | Moyer | G06F 12/126 | |
| 2021/0133115 A1* | 5/2021 | Wilson | G06F 12/122 | |
| 2021/0141694 A1* | 5/2021 | Cope | G06F 11/1464 | |
| 2021/0208799 A1* | 7/2021 | Wilcock | G06F 3/0665 | |
| 2021/0240657 A1* | 8/2021 | Kumar | G06F 11/1464 | |
| 2021/0263508 A1* | 8/2021 | Wang | G05B 17/02 | |
| 2021/0294701 A1* | 9/2021 | Satoyama | G06F 11/2028 | |
| 2021/0374095 A1* | 12/2021 | Wilson | G06F 16/184 | |
| 2022/0067549 A1* | 3/2022 | Vokaliga | G06F 3/0659 | |

* cited by examiner

SNAPSHOT ACCESS USING NOCOPY UNDEFINED THIN DEVICES

FIELD

This disclosure relates to computing systems and related devices and methods, and, more particularly, to a method and apparatus for enabling access to snapshot storage volumes using nocopy undefined thin devices.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A thin device (TDev) is tagged to identify the TDev as being used to access snapshot data on the storage system. If a snapshot is to be shipped to a cloud repository, the tagged TDev is linked to the snapshot, and mounted to a cloud tethering subsystem. When the tagged TDev is linked to the cloud tethering subsystem, the snapshot subsystem reads the thin device tag and, if the thin device is tagged, selectively does not execute a define process on the tagged thin device. By not executing the define process, linking the TDev requires generation of no metadata, such that the tracks of the thin device do not contain metadata pointers to locations of the snapshot data on the storage system. When data read operations are issued by the cloud tethering subsystem on the tagged thin device, the snapshot subsystem executes a one-time identification of the location of the requested data, without creating metadata for the thin device. A write to source will cause the old data to be saved to a new location within the source storage resource pool, but because the TDev is undefined, a private copy is not required even if the snapshot is created in a different storage resource pool.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
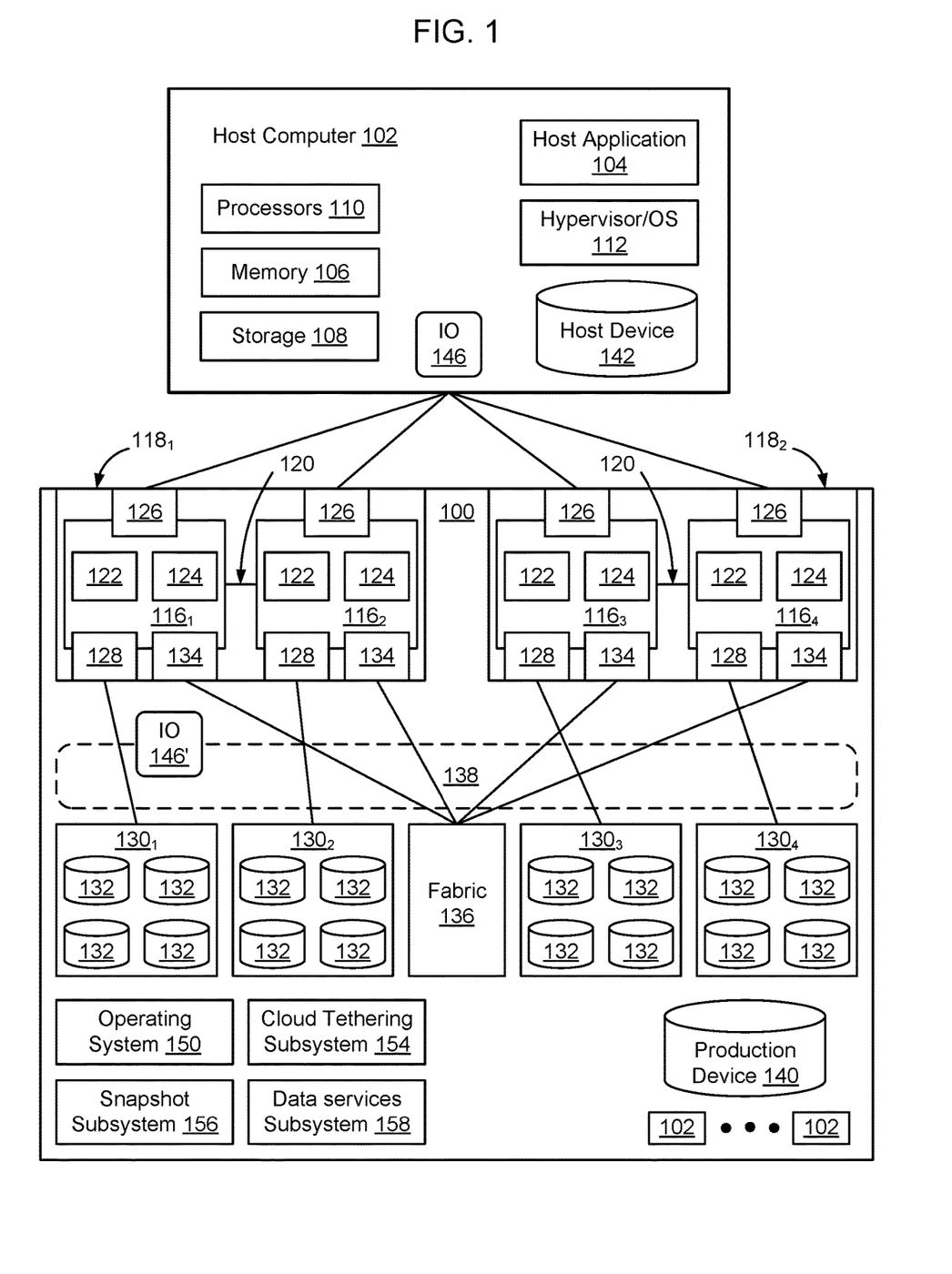
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140 (zoning).

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device 140 against loss of data, a snapshot (point in time) copy of the production device 140 may be created and maintained by the storage system 100. If the host computer 104 needs to obtain access to the snapshot copy, for example for data recovery, the snapshot copy may be linked to a logical storage volume (Tdev) and presented to the host computer 104 as a host device 142. The host computer 102 can then execute read/write IOs on the Tdev to access the data of the snapshot copy.

As shown in FIG. 1, in some embodiments the storage system 100 has an operating system 150, and one or more system applications, such as a cloud tethering subsystem 154, snapshot subsystem 156, and data services subsystem 158. In some embodiments, the system applications are implemented as applications executing within virtual machines on storage system 100.

Snapshot subsystem 156, in some embodiments, is configured to create "snapshots" of a volume of data such as production volume 140. A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a TDev) or may be linked to a target TDev when created. When a snapshot of a production volume is created, the snapshot may include all of the data of the production volume, or only the changes to the production volume that have occurred since the previous snapshot was taken.

In some embodiments, a user will set policies on a group of LUNs referred to as a storage group. These policies define the frequency of the snapshot, the retention period of the snapshots, and a cloud provider where the snapshots are to be stored. The frequency tells the snapshot subsystem 156 in the storage array 130 to create a snapshot against all the LUNs in a storage group at a regular cadence, as defined by the user. The sets of snapshots taken against a storage group are referred to as snapsets. The retention period defines the age of the snapshot when it should be deleted. The cloud provider tells the storage array the identity of the object repository where the snapshots need to be shipped.

Figure 2:
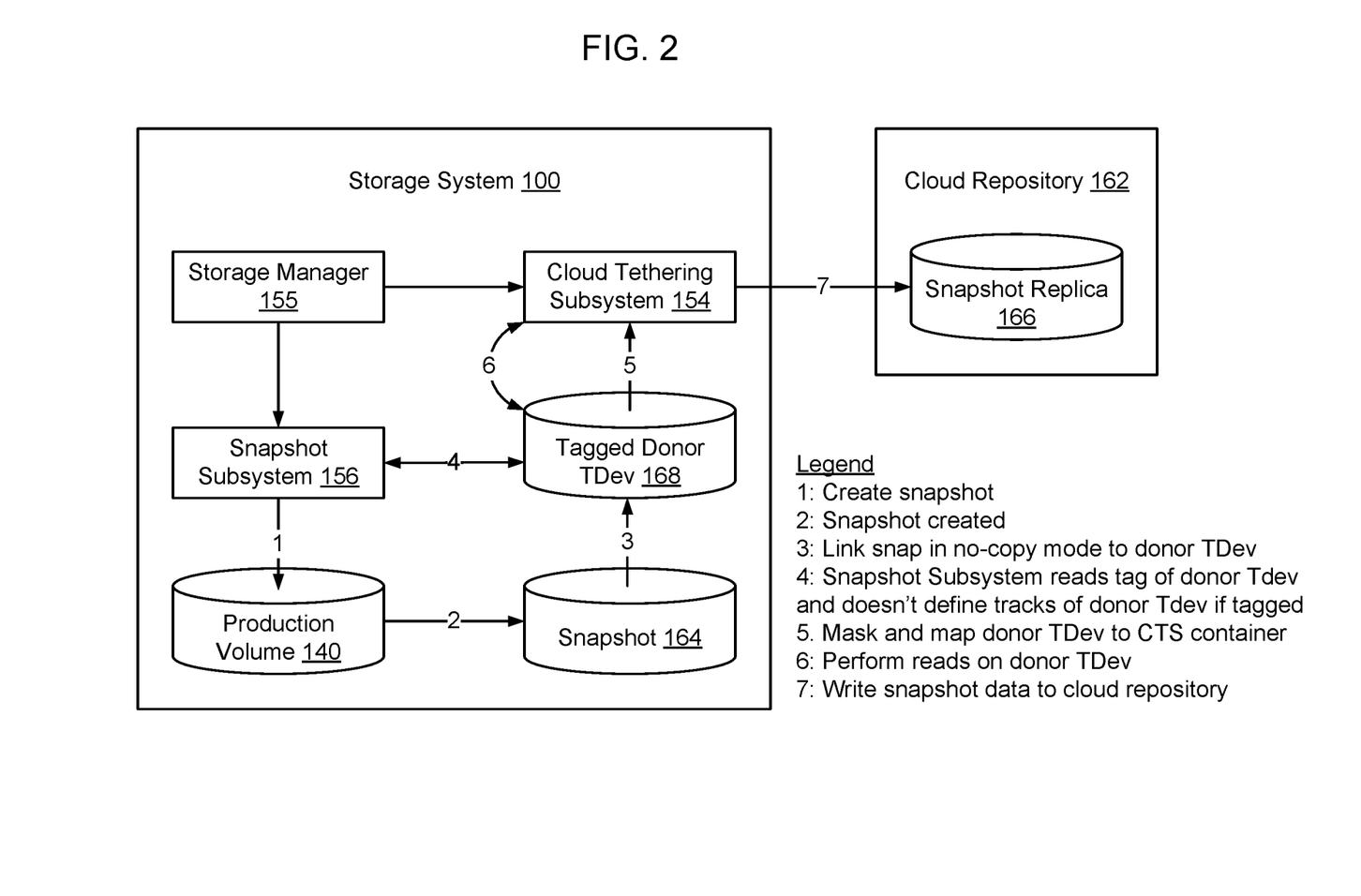
FIG. 2 is a functional block diagram of a storage system connected to a cloud repository, according to some embodiments.

The cloud tethering subsystem 154 is responsible for managing transmission of snapshots from the storage system 100 to an external cloud repository 162 (See FIG. 2). For example, it may be desirable to move at least some of the snapshot copies from the storage system 100 to a cloud repository 162 to free up space in the back-end drive arrays 130, or for many other reasons. In some embodiments, the cloud tethering subsystem 154 is implemented as an application 104 executing in a container in an emulation on storage system 100.

In connection with transmitting a snapshot to a cloud repository, a TDev is linked to the snapshot, and presented to the cloud tethering subsystem as a host device 142. The cloud tethering subsystem 154 then issues read operations on the snapshot, and sends the data to the cloud repository. To access storage resources of the storage system 100, the cloud tethering subsystem 154 issues read and write 10 operations 146, which are received by front end adapter 126 of the storage system, and processed by the front end adapter 126.

The cloud tethering subsystem 154 is the primary data mover that is responsible for moving 10 traffic between the back-end drive array 130 in the storage system 100 and the remote cloud repository 162. Unfortunately, shipment of the snapshot copies 164 from the storage system 100 to the cloud repository 162 by the cloud tethering subsystem 154 can be metadata intensive.

For example, conventionally, when a snapshot was to be moved to a cloud repository, a TDev would be linked to the snapshot. As part of this process, the snapshot subsystem would execute a "define" process, which would scan the entire target device, and cause the pointers of each track on the TDev to identify the location of the appropriate backend data of the snapshot. This provides access to the snapshot using the TDev, but consumes CPU resources and requires track level metadata to be generated for the TDev, as the TDev attached to the snapshot is "defined". Since the metadata tables have a finite capacity, generating additional metadata is undesirable. As used herein, the term "define" is used to refer to a process that changes the pointers of tracks of a target linked volume to identify the location of the backend data of the source volume.

Further, if the TDev is provisioned from a different SRP (Storage Resource Pool) than the source, the TDev will also need its own private allocations when there are new writes to the source volume, and the older data needs to be saved. For example, if the source is implemented using drives 132 in a first SRP, and the snapshot is implemented using drives 132 in a second SRP, a write to the source will require an allocation of storage on one of the drives 132 in the first SRP to save the old data. If the snapshot is created in a different storage resource pool, a private copy of the old data would also be required in the snapshot storage resource pool. Accordingly, a write on source would results in two allocations—one for the snapshot and one for the TDev. These behaviors cause additional use of system metadata and backend storage space.

According to some embodiments, when the donor TDev is linked to the snapshot it remains undefined, such that the snapshot subsystem 156 does not execute a define process on the donor TDev, and accordingly the tracks of the donor TDev do not point to the backend tracks of the snapshot 164 before the cloud tethering subsystem 154 issues read operations on the donor TDev. In some embodiments, the cloud tethering subsystem uses a set of TDev that are tagged. The tag identifies the TDev as being used by the cloud tethering subsystem to move snapshots to a cloud repository. When a TDev is linked to a snapshot, the snapshot subsystem 156 reads the tag, and if the TDev is tagged, the snapshot subsystem does not run a define process on the TDev. This prevents metadata from being created in connection with movement of snapshots to the cloud repository. Because the tracks of the donor TDev are not defined, if a write on source occurs which causes the old data to be moved to a new track in the source storage resource pool, no private copy is required. Rather, if a read occurs, the snapshot subsystem will determine the current location of the old data at that point in time, hence eliminating the need for a private copy of the old data in the storage resource pool in which the snapshot resides.

FIG. 2 is a functional block diagram of a storage system 100 connected to a cloud repository 162, according to some embodiments. As shown in FIG. 2, in some embodiments the snapshot subsystem 156 periodically creates snapshot copies 164 of a production volume 140 (FIG. 2, arrows 1 and 2). If the cloud tethering subsystem 154 determines that the snapshot copy 164 should be moved from the storage system 100 to a cloud repository 162, a tagged TDev (Thin Device) is linked to the snapshot copy (FIG. 2, arrow 3) and presented to the cloud tethering subsystem 154 (FIG. 2, arrow 5). The TDev that is linked to the snapshot copy for use by the cloud tethering subsystem will be referred herein as a "donor TDev" 168. In connection with linking the TDev to the cloud tethering subsystem 154, the snapshot subsystem reads the tag of the TDev (FIG. 2, arrow 4) to determine whether a define process should execute on the TDev, to cause the tracks of the TDev to point to the back-end locations where the snapshot data is stored on the storage system 100. If the TDev is tagged, the snapshot subsystem does not execute the define process on the linked donor TDev, such that the tracks of the linked donor TDev remain undefined.

The cloud tethering subsystem 154 executes read operations on the donor TDev 168 (FIG. 2, arrow 6) to access the data of the snapshot copy 164, and then transmits the data to the cloud repository 162 (FIG. 2, arrow 7). Once a snapshot replica 166 has been created in the cloud repository 162, the snapshot copy 164 on the storage system 100 can be erased.

In some embodiments, the cloud tethering subsystem 154 implements a block LUN based snapshot shipping application, that ships sets of snapshots taken on a timeline to a heterogenous cloud repository 162 in object format. In some embodiments, the cloud tethering subsystem 154 is implemented as a Linux-based in-build container that is responsible for shipping the snapshots 164 to the cloud repository 162. The cloud snapshot shipping process generates cloud read traffic end to end within the storage system 100 where the cloud tethering subsystem 154 container is hosted, when the snapshot 164 is shipped to the cloud repository 162.

Figure 3:
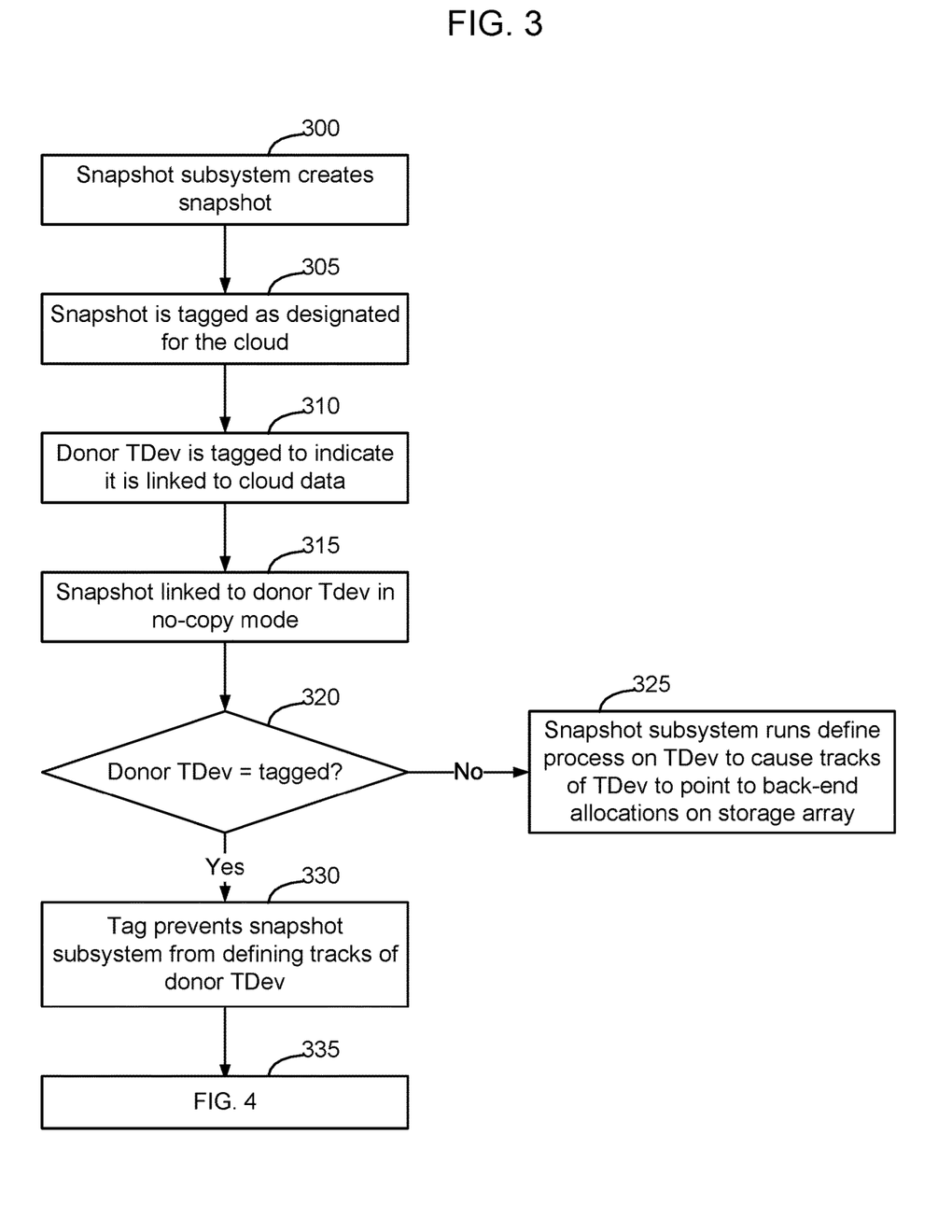
FIGS. 3 and 4 are a flow chart of a method of enabling access to snapshot storage volumes using nocopy undefined thin devices, in connection with movement of a snapshot to a cloud repository, according to some embodiments.
Figure 4:
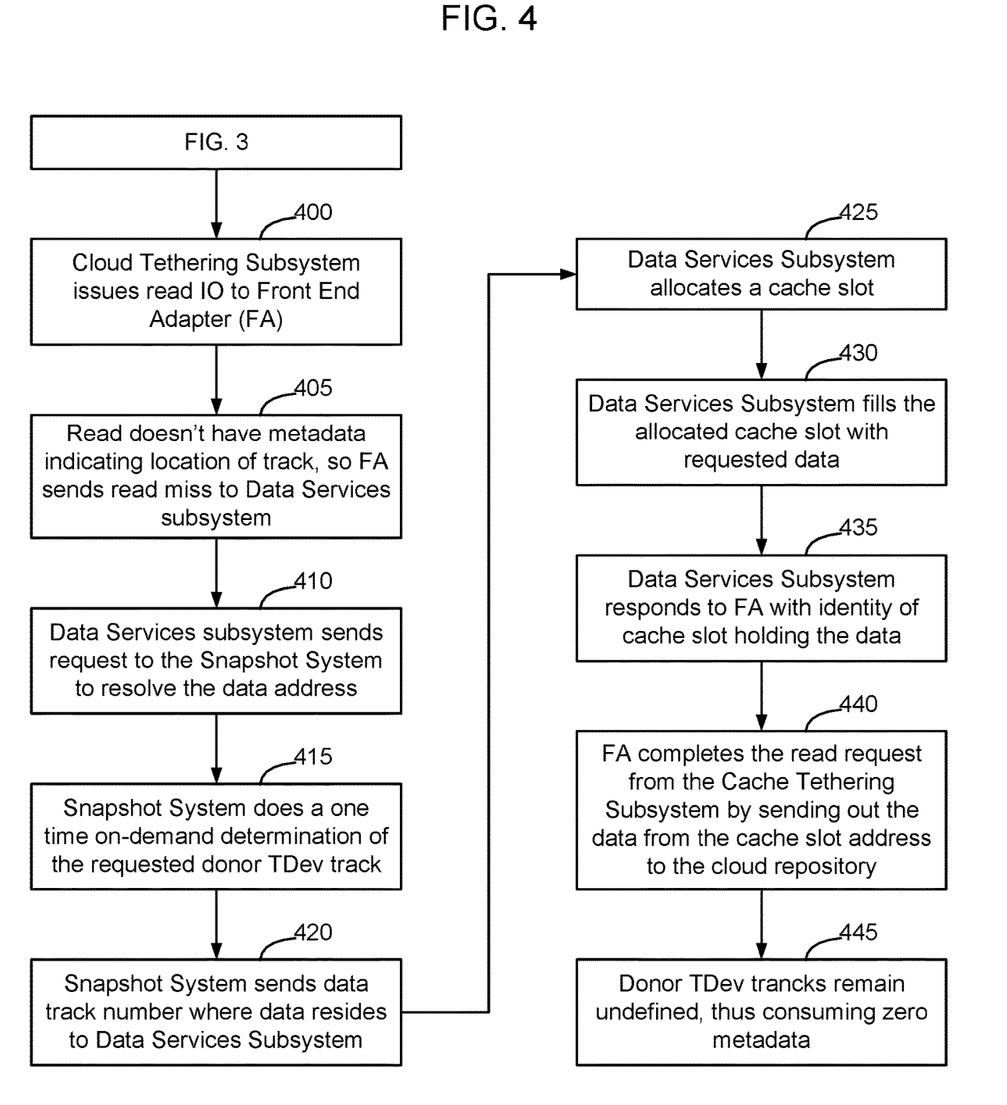

FIGS. 3 and 4 are a flow chart of a method of efficiently transmitting snapshots to a cloud repository, using an undefined donor TDev and, hence, without creating metadata for the donor TDev, according to some embodiments. Although FIGS. 3 and 4 will discuss movement of volumes of data by the cloud tethering subsystem 154 in connection with movement of snapshots 164 to a cloud repository, the cloud tethering subsystem 154 could also be used to move other volumes of data from the storage system 100 to the cloud repository 162 as well. Likewise, although some embodiments are discussed in connection with movement of data off the storage system 100 by cloud tethering subsystem 154, the method of FIGS. 3 and 4 can be extended to movement of storage volumes by other system applications, where the other system applications are moving the storage volumes.

As shown in FIG. 3, in some embodiments the cloud tethering subsystem 154 is moving snapshots 164 that are created by the snapshot subsystem 156 (block 300). In some embodiments, some snapshots 164 are kept on the storage system 100, and some snapshots 164 are shipped by the cloud tethering subsystem 154 to the cloud repository 162. Those snapshots 164 that are to be moved to the cloud repository 162 are tagged as being designated to be moved to the cloud repository 162 (block 305). A tag such as "Cloud_Donor_Snap" may be used to designate a snapshot as being intended to be moved to the cloud repository 162. The snapshots 164 may be tagged as designated to be moved to the cloud repository 162 immediately upon creation by the snapshot subsystem 156, or may be tagged at some later point in time after creation of the snapshot 164.

In some embodiments, a designated set of TDevs (Thin Devices) are created for use by the cloud tethering subsystem 154 in connection with shipping data volumes to the cloud repository 162. These thin devices are tagged, for example, using a "CLOUD_DONOR_ACCESS_THIN_DEV" tag (Block 310).

In some embodiments, when a donor TDev is linked to a snapshot, the snapshot subsystem reads the tag of the donor TDev to determine whether a define process should be executed on the donor TDev. If the donor TDev is tagged, the snapshot subsystem does not execute the define process on the donor TDev, such that the tracks of the donor TDev remain undefined. Not executing the define process enables zero metadata to be generated in connection with linking the donor TDev to the snapshot, and also reduces the use of processor and other storage system resources.

When the cloud tethering subsystem 154 wants to ship the snapshot 164 to the cloud repository 162, it needs to access the snapshot 164. In some embodiments, the cloud tethering subsystem 154 sends a prepare call to the snapshot subsystem 156. As part of the prepare call, the cloud-tagged snapshot 164 is linked in nocopy mode to a donor TDev (block 315). In no-copy mode, the data of the snapshot is not actually copied to the donor TDev. The donor TDev worldwide number (WWN) is also shared with the cloud tethering subsystem 154, and the donor TDev is masked and mapped to the container of the cloud tethering subsystem 154. With the WWN of the donor TDev, the cloud tethering subsystem 154 can issue read operations on the donor TDev to cause the data of the snapshot to be shipped to the cloud repository 162 (see FIG. 4).

When the donor TDev is linked to the snapshot, in some embodiments a determination is made by the snapshot subsystem as to whether the donor TDev is tagged (block 320). If the donor TDev is not tagged (a determination of NO at block 320), the snapshot subsystem executes a define process on the donor TDev to cause the tracks of the donor TDev to point to back-end allocations on storage array where the storage system data is being stored (block 325). If the donor TDev is tagged (a determination of YES at block 320), the snapshot subsystem does not execute the define process on the donor TDev, such that the presence of the tag prevents the snapshot subsystem from defining the tracks of the donor TDev (block 330). The process then continues to FIG. 4 (block 335).

Figure 5:
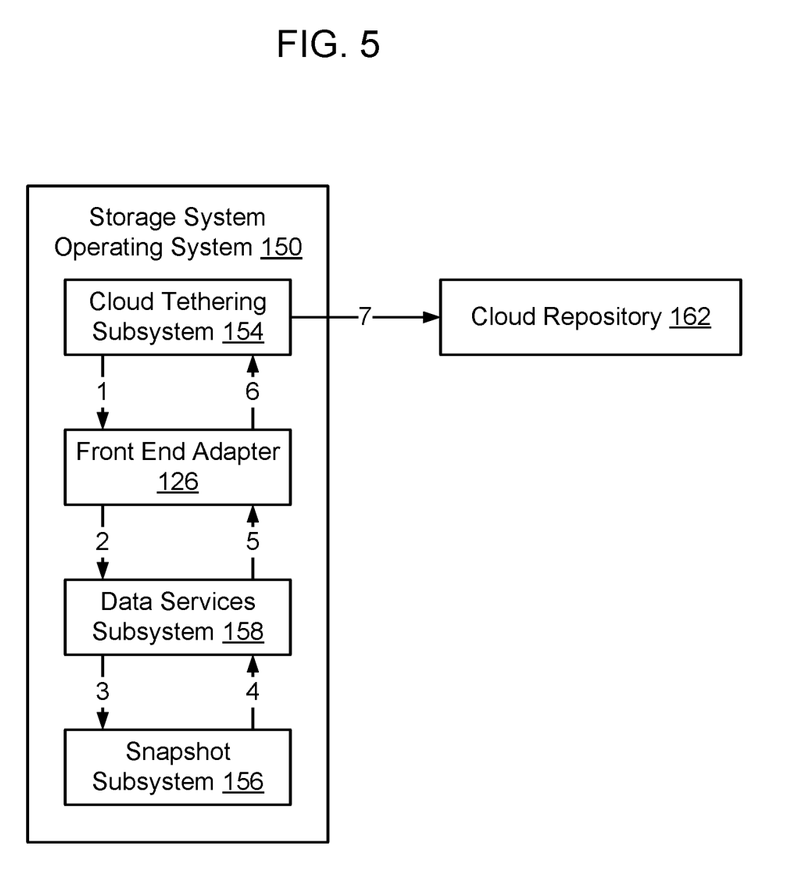
FIG. 5 is a functional block diagram illustrating execution of a read operation on a nocopy undefined thin device, according to some embodiments.

FIG. 5 is a functional block diagram illustrating operation of the storage system 100, when the donor TDev 168 that is linked to the snapshot 164 is undefined, according to some embodiments. The process shown in FIG. 5 is also shown in the flow chart of FIG. 4, blocks 400-440.

As shown in FIGS. 4 and 5, if the donor TDev is undefined, a read 10 operation on a track of the donor TDev 168, issued by the cloud tethering subsystem 154 (FIG. 5, arrow 1; FIG. 4, block 400), will not contain metadata identifying the location of the requested snapshot data. Accordingly, when the front-end adapter 126 receives the read 10, the front-end adapter 126 sends a read miss to the data services subsystem 158 (FIG. 5, arrow 2; FIG. 4, block 405). The data services subsystem 158 sends the request to the snapshot subsystem 156 to ask the snapshot subsystem 156 to resolve the data address of the snapshot data (FIG. 5, arrow 3; FIG. 4, block 410). In response, the snapshot subsystem 156 does a one-time on-demand determination of the requested donor TDev track (FIG. 4, block 415) to identify the current location within managed drives 132 where the requested data is stored.

The snapshot subsystem 156 sends the data track number of one of the managed drives 132 where the data resides to the data services subsystem 158 (FIG. 5, arrow 4; FIG. 4, block 420). The data services subsystem 158 allocates a slot in cache 138 (FIG. 4, block 425), and the data services subsystem 158 fills the allocated cache slot with the data from the address provided at the previous step (FIG. 4, block 430). The data services subsystem 158 then responds to the front-end adapter 126 with the identity of the cache slot holding the data (FIG. 5, arrow 5; FIG. 4, block 435). The front-end adapter completes the read request from the cloud tethering subsystem 154 by sending out the data from the cache slot address to the cloud repository 162 (FIG. 5, arrows 6 and 7; FIG. 4, block 440).

In some embodiments, although the snapshot subsystem 156 does a one-time on-demand determination of the requested donor TDev track, this does not result in creation of metadata for the donor TDev. Rather, the location of the data is used directly by the data services subsystem 158, which uses the location information to move the requested data to the selected cache slot. At that point, the location of the requested data is discarded, and not stored in the donor TDev track. Accordingly, providing the location of the requested data by the snapshot subsystem does not result in creation of metadata associated with the donor TDev.

Figure 6:
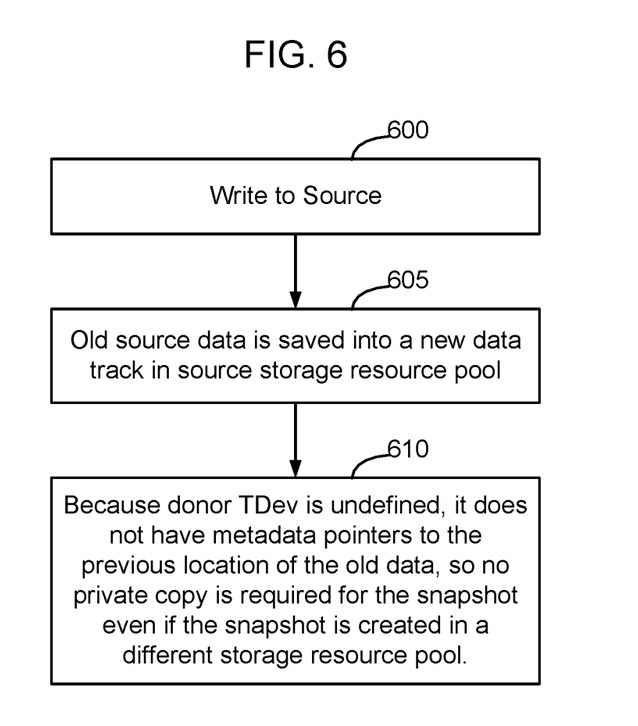
FIG. 6 is a flow chart of a method of executing a write operation on a source device when a nocopy undefined thin device is being used to move a snapshot to a cloud repository, according to some embodiments.

FIG. 6 is a flow chart of a process of implementing a write operation to a source device when a snapshot of the source device is linked to an undefined donor TDev. Specifically, when a write to source occurs (block 600) the old source data is saved to a new data track number in the source storage resource pool (block 605). Because the donor TDev is undefined, the donor TDev does not have metadata pointers to the previous location of the old data, so a private copy is not required for the donor TDev, even if the snapshot was created in a different storage resource pool (block 610). Specifically, if the donor TDev had been defined, the metadata of the donor TDev would point to the previous location of the old data in the source storage resource pool. If the source was in a different storage resource pool, the write on source would require the old data to be written to a new location in the source storage resource pool. To enable the snapshot to access the old data, a private copy would need to also be created for the snapshot in the snapshot's storage resource pool.

By leaving the tracks of the donor TDev undefined, this is not required, because the snapshot subsystem will simply determine the current location of the old data, on demand, and return the new location of the old data when requested. Accordingly, leaving the donor TDev as undefined, reduces the overall storage resources required to implement the snapshot within the storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for providing snapshot access using a nocopy undefined thin device, the computer program including a set of instructions which, when executed by a computer, cause the computer to perform a method comprising the steps of:

creating a snapshot of a production volume by a snapshot subsystem;

linking the snapshot to a thin device;

inspecting, by the snapshot subsystem, the thin device for the presence of a tag identifying the thin device as being used by a cloud tethering subsystem in connection of movement of the snapshot to a cloud repository;

when the tag doesn't exist on the thin device:

implementing a define process on the thin device by the snapshot subsystem, the define process changing pointers of tracks of the thin device to identify locations of backend data of the snapshot of the production volume;

mounting the untagged thin device in a host application;

issuing data read operations, by the host application, on the tracks of the untagged thin device; and when the tag exists on the thin device:

not implementing the define process on the tagged thin device by the snapshot subsystem;

mounting the tagged thin device in the cloud tethering subsystem; and issuing data read operations, by the cloud tethering subsystem, on the tracks of the tagged thin device.

2. The non-transitory tangible computer readable storage medium of claim 1, wherein the production volume has data stored on backend allocations of tracks of memory, and wherein not implementing the define process on the tagged thin device causes the tagged thin device to remain undefined such that tracks of the tagged thin device do not contain pointers to the backend allocations of the tracks of memory of the production volume.

3. The non-transitory tangible computer readable storage medium of claim 2, further comprising the step of executing the issued data read operations by a front-end adapter of a storage system, and wherein the step of executing the data read operations, by the front end adapter, comprises issuing a respective request, for each data read operation, to a data services subsystem to resolve the data address associated with the respective data read operation.

4. The non-transitory tangible computer readable storage medium of claim 3, further comprising sending, by the data services subsystem, a request to a snapshot subsystem for a one time on-demand determination of a location of a requested track of the thin device associated with the respective read operation.

5. The non-transitory tangible computer readable storage medium of claim 4, further comprising receiving, by the data services subsystem, a response from the snapshot subsystem, with a data track number where the requested data resides on the storage system.

6. The non-transitory tangible computer readable storage medium of claim 5, further comprising not storing the data track number in the tagged thin device, such that the track of the tagged thin device remains undefined even after execution of the read operation on the track of the tagged thin device.

7. The non-transitory tangible computer readable storage medium of claim 5, further comprising allocating a slot in a shared global memory, by the data services subsystem, and copying the requested data from the data track where the requested data resides on the storage system to the allocated slot in the shared global memory.

8. The non-transitory tangible computer readable storage medium of claim 7, further comprising forwarding, by the front-end adapter, the requested data from the allocated slot in the shared global memory to the cloud repository.

9. A method of providing snapshot access using a nocopy undefined thin device, the method comprising the steps of:
creating a snapshot of a production volume by a snapshot subsystem;
linking the snapshot to a thin device;
inspecting, by the snapshot subsystem, the thin device for the presence of a tag identifying the thin device as being used by a cloud tethering subsystem in connection of movement of the snapshot to a cloud repository;
when the tag doesn't exist on the thin device:
implementing a define process on the thin device by the snapshot subsystem, the define process changing pointers of tracks of the thin device to identify locations of backend data of the snapshot of the production volume;
mounting the untagged thin device in a host application;
issuing data read operations, by the host application, on the tracks of the untagged thin device; and
when the tag exists on the thin device:
not implementing the define process on the tagged thin device by the snapshot subsystem;
mounting the tagged thin device in the cloud tethering subsystem; and
issuing data read operations, by the cloud tethering subsystem, on the tracks of the tagged thin device.

10. The method of claim 9, wherein the production volume has data stored on backend allocations of tracks of memory, and wherein not implementing the define process on the tagged thin device causes the tagged thin device to remain undefined such that tracks of the tagged thin device do not contain pointers to the backend allocations of the tracks of memory of the production volume.

11. The method of claim 10, further comprising the step of executing the issued data read operations by a front-end adapter of a storage system, and wherein the step of executing the data read operations, by the front end adapter, comprises issuing a respective request, for each data read operation, to a data services subsystem to resolve the data address associated with the respective data read operation.

12. The method of claim 11, further comprising sending, by the data services subsystem, a request to a snapshot subsystem for a one time on-demand determination of a location of a requested track of the thin device associated with the respective read operation.

13. The method of claim 12, further comprising receiving, by the data services subsystem, a response from the snapshot subsystem, with a data track number where the requested data resides on the storage system.

14. The method of claim 13, further comprising not storing the data track number in the tagged thin device, such that the track of the tagged thin device remains undefined even after execution of the read operation on the track of the tagged thin device.

15. The method of claim 13, further comprising allocating a slot in a shared global memory, by the data services subsystem, and copying the requested data from the data track where the requested data resides on the storage system to the allocated slot in the shared global memory.

16. The method of claim 15, further comprising forwarding, by the front-end adapter, the requested data from the allocated slot in the shared global memory to the cloud repository.

* * * * *